US00RE45417E

(19) United States
(12) Reissued Patent
Smith

(10) Patent Number: US RE45,417 E
(45) Date of Reissued Patent: Mar. 17, 2015

(54) SELECTIVELY CONFIGURABLE CHAIR SYSTEM

(71) Applicant: SmithWorks, Inc., Jordan, MN (US)

(72) Inventor: David L. Smith, Jordan, MN (US)

(73) Assignee: SmithWorks, Inc., Jordan, MN (US)

(21) Appl. No.: 14/267,994

(22) Filed: May 2, 2014

Related U.S. Patent Documents

Reissue of:
(64) Patent No.: 8,474,916
Issued: Jul. 2, 2013
Appl. No.: 13/006,880
Filed: Jan. 14, 2011

(51) Int. Cl.
*A47C 4/02* (2006.01)

(52) U.S. Cl.
USPC ..... 297/440.1

(58) Field of Classification Search
USPC ..... 297/16.1, 17, 344.18, 440.1, 440.24
See application file for complete search history.

(56) References Cited

U.S. PATENT DOCUMENTS

| | | | | |
|---|---|---|---|---|
| 517,929 | A | 4/1894 | March | |
| 550,256 | A | 11/1895 | Deane | |
| 1,344,431 | A | 6/1920 | Albertie | |
| 1,717,908 | A | 6/1929 | Makary | |
| 2,660,228 | A * | 11/1953 | Reinhold | 297/440.1 |
| 2,701,009 | A * | 2/1955 | Richard | 297/440.16 |
| 2,962,086 | A * | 11/1960 | Waltimyer | 297/392 |
| 3,745,937 | A | 7/1973 | Gail | |
| 4,011,821 | A * | 3/1977 | Neal | 108/156 |
| 4,193,630 | A * | 3/1980 | Steele | 297/17 |
| 5,096,186 | A * | 3/1992 | Wilkinson et al. | 482/52 |
| 5,688,024 | A * | 11/1997 | Arizpe-Gilmore | 297/217.1 |
| 6,969,112 | B1 * | 11/2005 | Sherrill | 297/16.1 |
| 7,328,951 | B2 * | 2/2008 | Ward et al. | 297/344.18 |
| 7,549,702 | B2 * | 6/2009 | Meyers | 297/344.18 |
| 7,637,572 | B1 | 12/2009 | Cirami | |
| 2002/0117878 | A1 | 8/2002 | Fox | |
| 2004/0066075 | A1 | 4/2004 | Yeh | |
| 2008/0042474 | A1 | 2/2008 | Dickie et al. | |
| 2008/0174233 | A1 | 7/2008 | Bawendi et al. | |
| 2009/0243346 | A1 | 10/2009 | Chen | |
| 2010/0314926 | A1 | 12/2010 | Chesness | |
| 2012/0274107 | A1 | 11/2012 | Chesness | |

FOREIGN PATENT DOCUMENTS

| | | |
|---|---|---|
| FR | 2096134 | 2/1972 |
| WO | 03073890 | 9/2003 |

OTHER PUBLICATIONS

International Search Report for related PCT Application No. PCT/US2010/020641 mailed May 7, 2010 (5 pp.).

* cited by examiner

*Primary Examiner* — Catherine S. Williams
(74) *Attorney, Agent, or Firm* — Winthrop & Weinstine, P.A.

(57) ABSTRACT

A stowable chair system having a base assembly and a back pivotably connected to the base assembly. A first leg retention assembly operatively coupled to the base assembly to selectively retain and position legs in a seating configuration. A second leg retention assembly separate from the first leg retention assembly to selectively retain and position the legs in a stowing configuration.

49 Claims, 5 Drawing Sheets

SELECTIVELY CONFIGURABLE CHAIR SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The invention generally relates to chairs.

BACKGROUND OF THE INVENTION

Portable chairs are useful for transporting a chair to a desired location where the chair can be set up and used. One exemplary application for such a chair is hunting, which often requires a user to both transport a chair to a relatively inaccessible location and stay seated for long periods of time during the hunt. Other exemplary applications include sporting events, social events, and ice fishing.

SUMMARY OF THE INVENTION

Embodiments of the invention include a stowable chair system. Such a chair system is useful for providing a chair that can be placed in a stowed configuration so that it can easily be transported to a desired location for use. Some embodiments of the invention are particularly useful for use as a hunting chair, where the chair can be placed in its stowed configuration and carried to a hunting location where it can be placed in a seating configuration for use by a hunter. Embodiments of the invention are also useful at sporting events, social events, and for ice fishing.

Some embodiments of the invention include a chair with a first leg retention assembly and a second leg retention assembly. The first leg retention assembly is useful for retaining chair legs in a seating configuration, and the second leg retention assembly is useful for retaining chair legs in a stowing configuration. Further, some embodiments also include a swivel system to allow a user seated in the chair to swivel with respect to the legs when the chair is in the seating configuration. Accordingly, embodiments of the invention provide a chair that is both easily stowable in a compact shape for transporting to desired locations, as well as large and comfortable for a user that is seated in the chair, even for long periods of time.

BRIEF DESCRIPTION OF THE DRAWING

The following drawings are illustrative of particular embodiments of the invention and therefore do not limit the scope of the invention. The drawings are not necessarily to scale (unless so stated) and are intended for use in conjunction with the explanations in the following detailed description. Embodiments of the invention will hereinafter be described in conjunction with the appended drawings, wherein like numerals denote like elements.

DETAILED DESCRIPTION OF THE INVENTION

Figure 1:
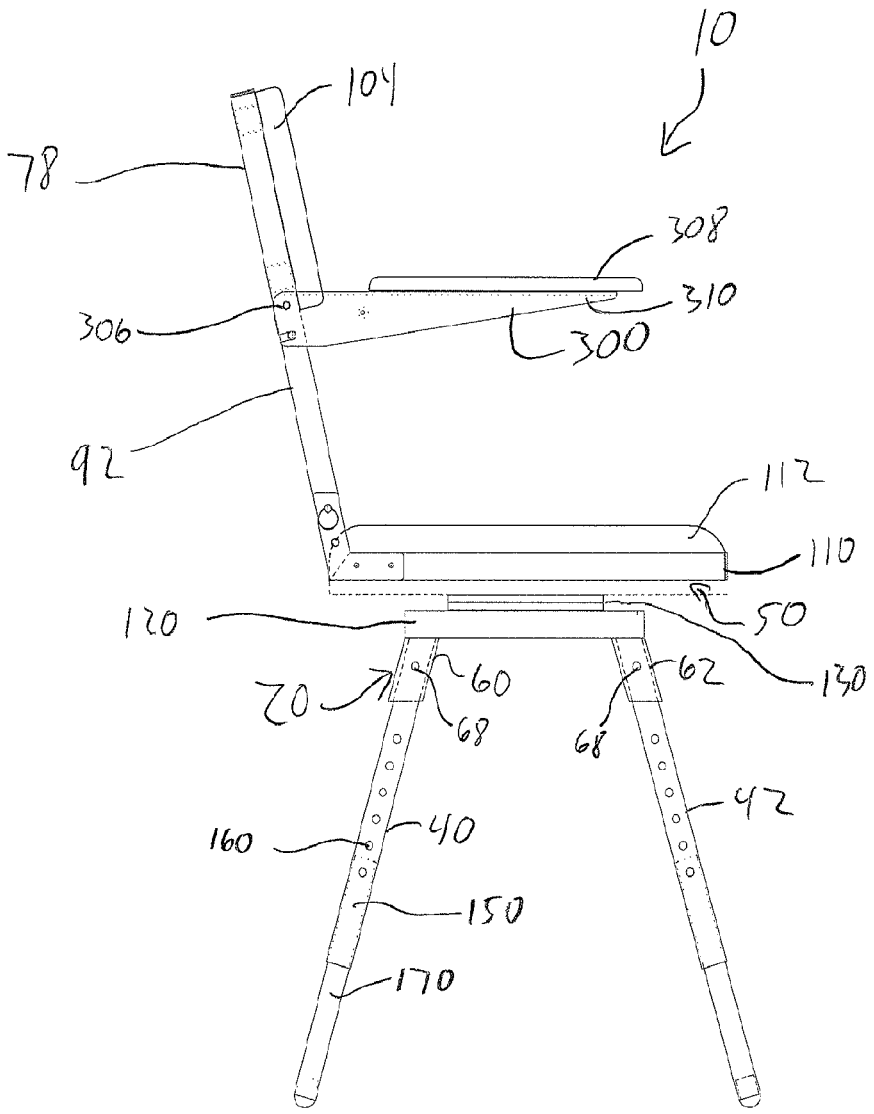
FIG. 1 shows a side plan view of a chair in a seating configuration in accordance with an embodiment of the invention.

For the purpose of promoting an understanding of the principles of the invention, reference will now be made to the embodiments illustrated in the drawing and specific language will be used to describe the same. It will, nevertheless, be understood that no limitation of the scope of the invention is thereby intended; any alterations and further modifications of the described or illustrated embodiments, and any further applications of the principles of the invention as illustrated therein, are contemplated as would normally occur to one skilled in the art to which the invention relates. It should be noted that all references to vertical, horizontal, above, below, front, rear, left, right and the like are terms of convenience referring to the chair as positioned in a seating configuration.

Embodiments of the invention include a stowable chair system 10. Such a chair system 10 is useful for providing a chair that can be placed in a stowed configuration such that it can easily be transported to a desired location for use. Some embodiments of the invention are particularly useful for use as a hunting chair, where the chair can be placed in its stowed configuration and carried to a hunting location where it can be placed in a seating configuration for use by a hunter, and for use at sporting events, social events, and for ice fishing.

Figure 2:
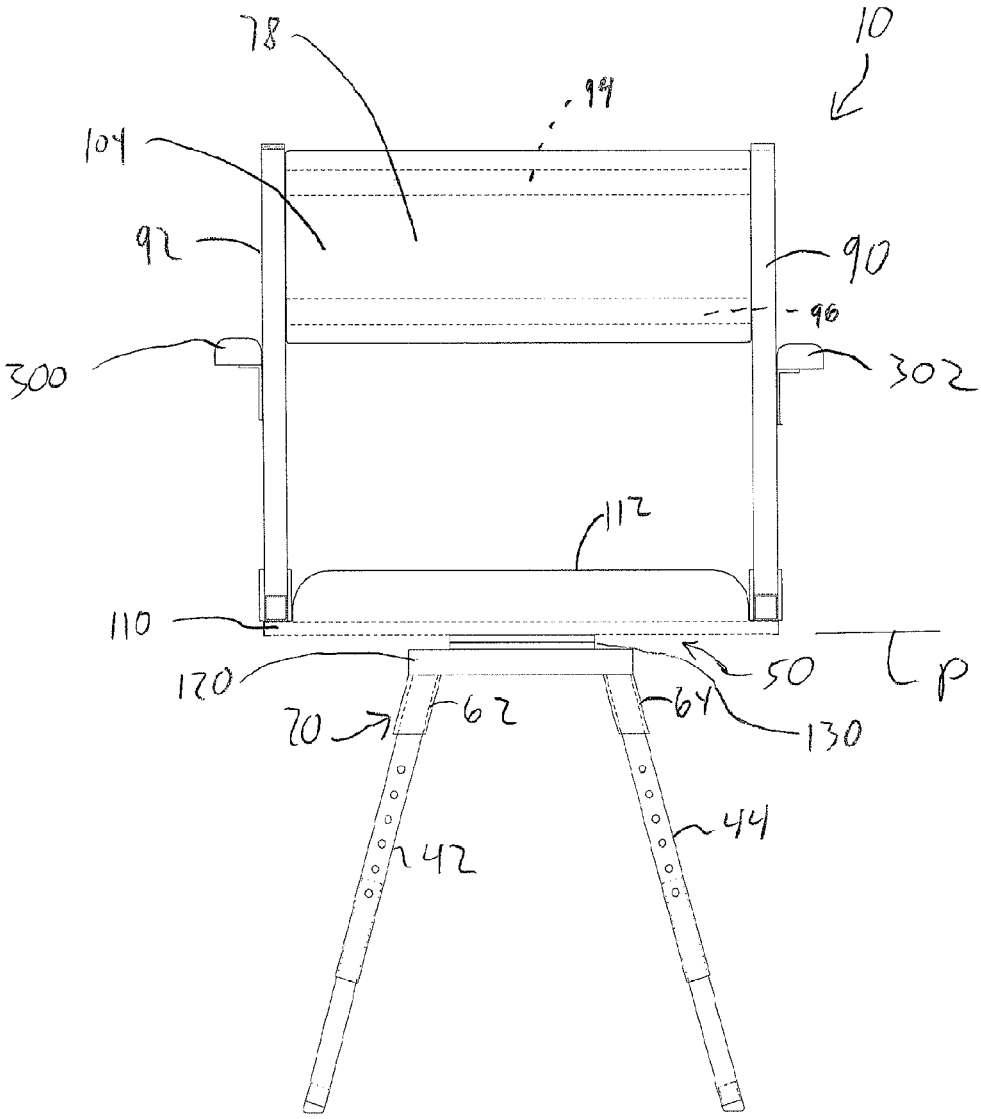
FIG. 2 shows a front plan view of a chair in a seating configuration in accordance with an embodiment of the invention.
Figure 3A:
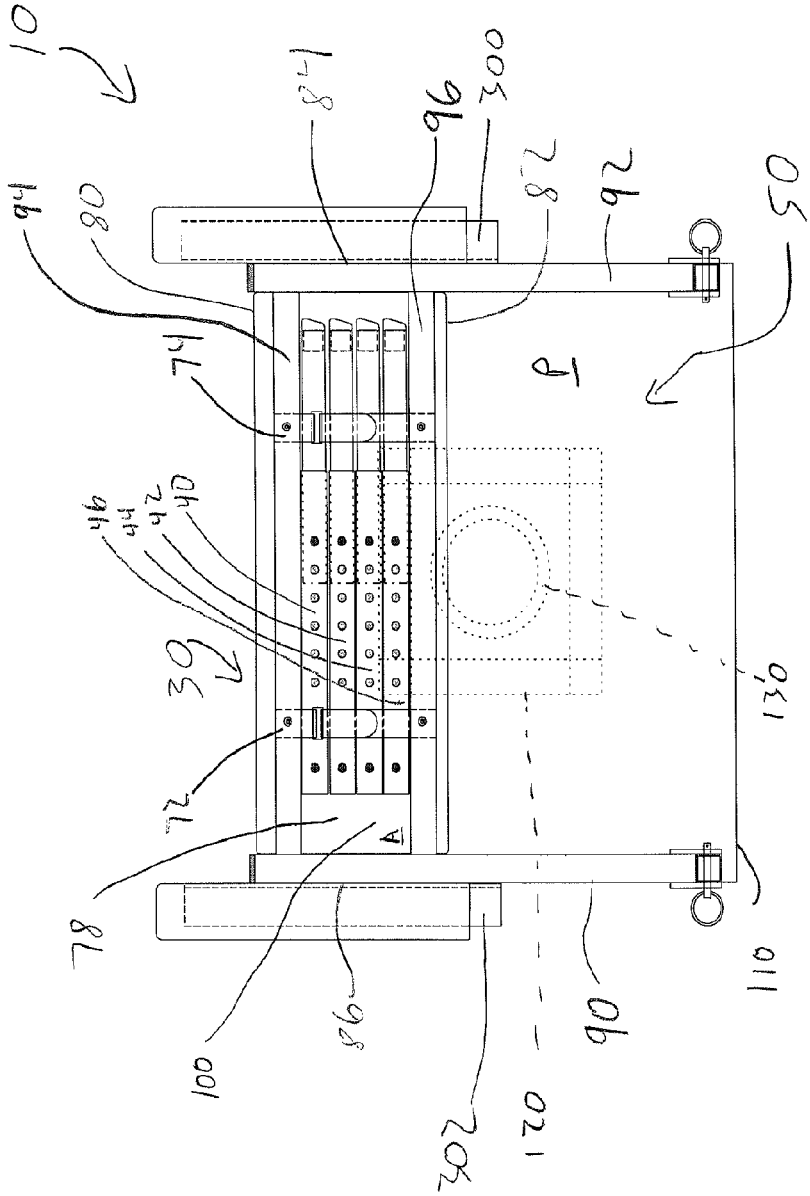
FIG. 3A shows a back plan view with hidden lines of a chair in a stowing configuration in accordance with an embodiment of the invention.

As shown in FIGS. 1-3A, some embodiments of the invention include a chair system 10 with a first leg retention assembly 20 and a second leg retention assembly 30. The first leg retention assembly is useful for retaining first, second, third, and fourth legs 40, 42, 44, 46 in a seating configuration as shown in FIGS. 1-2, while the second leg retention assembly is useful for retaining first, second, third, and fourth legs in a stowing configuration, as shown in FIG. 3A.

As shown by comparison of FIGS. 1-2 with FIG. 3A, in some embodiments the first leg retention assembly 20 is operatively coupled to a base assembly 50 to selectively retain and position the first, second, third and fourth legs 40, 42, 44, 46 in a seating configuration, and the second leg retention assembly 30 is separate from the first leg retention assembly to selectively retain and position the first, second, third, and fourth legs in a stowing configuration. Such an arrangement allows for a compact size for easier portability in the stowing configuration.

The first leg retention assembly 20 can include any structure useful for retaining the legs 40, 42, 44, 46 in a configuration useful for seating (i.e., extending generally downward from a base supporting a seating surface). In the embodiment shown in FIGS. 1-2, the first leg retention assembly includes first, second, third, and fourth leg attachment members 60, 62, 64 (the fourth leg attachment is not shown in FIG. 1 or 2) extending from the base assembly 50. In some embodiments, each attachment member has a cross-sectional dimension slightly less than its corresponding leg, such that it fits inside of its corresponding leg (or vice-versa). Each attachment member can also include a spring loaded protrusion (not shown) that engages a corresponding aperture 68 (FIG. 1) to lock the leg to its respective attachment member. In such embodiments, when a user desires to remove the leg, the user may depress the protrusion to unlock the leg from its respective attachment member.

The second leg retention assembly 30 can include any structure useful for retaining the legs 40, 42, 44, 46 in a configuration useful for stowing. In certain embodiments, as shown in FIG. 3A, the second leg retention assembly allows the first, second, third, and forth legs to be parallel to each other when in the stowing configuration. In such embodiments, each of the legs may reside in a single plane. Further, the legs can be in apposition to each other (e.g., the first leg can be in apposition to the second leg, the second leg can be in apposition to the first leg and the third leg, the third leg can be in apposition to the second leg and the fourth leg, and the fourth leg can be in apposition to the third leg, or any similar arrangement). Such embodiments allow the chair to assume a compact shape when in the stowing configuration.

In some embodiments, as shown in FIG. 3A, the second leg retention assembly 30 includes a strap system having one or more straps 72, 74 (each strap may include a single strap member that is folded back on itself or two joinable strap members) useful for retaining the legs. In the embodiment shown, the first, second, third, and fourth legs are retained only by straps 72, 74, such that no other mechanism is required to retain the legs in the stowing configuration. In one embodiment, the strap system includes two hook and corresponding loop straps attached to a back 78 of the chair 10. In some embodiments, the strap system also includes a ring (e.g., a 1 inch rectangular plastic ring). In such embodiments, each strap (e.g., a hook and loop strap) is threaded through the ring, pulled tight, and then secured to itself. Such embodiments allow the legs to be retained tighter than overlapping hook and loop straps without such a ring.

In some embodiments, as shown in FIG. 3A, the back 78 has a first perimeter edge 80 and a second perimeter edge 82 opposite the first perimeter edge. The back 78 can also have a third perimeter edge 84 and a fourth perimeter edge 86 opposite the third perimeter edge. In certain embodiments, the first, second, third, and fourth legs do not extend beyond any of the first, second, third, or fourth perimeter edges when retained by the second leg retention assembly 30 in the stowing configuration.

As shown in FIG. 2, in some embodiments the base assembly 50 defines a plane P and the first, second, third, and fourth legs 40, 42, 44, 46 extend from the plane when retained by the first leg retention assembly 20 in the seating configuration. In such a configuration, the first, second, third, and fourth legs are generally parallel to the plane when retained by the second leg retention assembly 30 in the stowing configuration, as shown in FIG. 3A.

The back 78 is configured to supply a comfortable supportive member to a user sitting in the chair 10. In some embodiments, it is pivotably connected (e.g., via a bolt) to the base assembly 50 such that it can be folded with respect to the base assembly to provide a compact shape for the stowing configuration. In some embodiments, the back 78 has a first upright member 90 and a second upright member 92 spaced from the first upright member. The back 78 can also have a first horizontal frame member 94 and a second horizontal member 96 connected to the first and second upright members. In such embodiments, the second horizontal member can be spaced from the first horizontal member. Further, as shown in FIG. 3A, an area A (e.g., a rectangular area) defined by the first and second upright members and the first and second horizontal members can be sized to receive the first, second, third, and fourth legs 40, 42, 44, 46 when the first, second, third, and fourth legs are retained by the second leg retention assembly 30 in the stowing configuration. In some embodiments, the distance between the first and second horizontal members is such that the first leg can be in apposition to the first horizontal member and the fourth leg can be in apposition to the second horizontal member while the legs are in apposition to each other when retained in the second leg retention assembly. In embodiments where the second leg retention assembly includes a strap system, the strap system can include straps 72, 74 spanning (and optionally attached to) the first and second horizontal members. The members themselves can be any rigid member, and in some embodiments include elongated hollow members with a square or circular cross-sectional shape comprising aluminum (e.g., powder-coated aluminum).

In some embodiments, the back 78 includes a substrate 100 spanning the area defined by the first and second upright members 90, 92 and the first and second horizontal members 94, 96. Further, a back fabric 104 can be provided in apposition to the substrate to span the area defined by the first and second upright members and the first and second horizontal members. In a particular embodiment, the fabric includes a polyester.

As shown in FIGS. 1-2, the base assembly 50 can include any structure for supporting a user sitting on the chair 10 and for supporting the first leg retention assembly 20. In some embodiments, the base assembly 50 includes a first base member 110 pivotably connected to the back 78 and providing a seating surface for a user (e.g., with a cushion and fabric 112). In such embodiments, the seating surface and the back fabric of the back can be in apposition when the chair is in the stowing configuration. As shown in FIGS. 1-3A, the base assembly 50 can also include a second base member 120 spaced from the first base member. In this embodiments, the second base member includes (e.g., is attached to or is integrally formed therewith) the first leg retention assembly 20. Further, in such embodiments, the first base member can be swivably connected to the second base member by a swivel system 130. Such a swivel system allows a user seated in the chair to swivel with respect to the legs 40, 42, 44, 46 when the chair is in the seating configuration. In some embodiments, the swivel system includes a rotatable bearing assembly that allows the first base member to swivel 360 degrees relative to the second base member. Preferably, the swivel system is quiet during a swivel operation so as not to alert any prey of the presence of a hunter if the chair is being used during a hunt. Accordingly, because of the configuration of the first and second leg retention assemblies, embodiments of the invention provide a compact stowable chair that also provides a swiveling function.

The legs 40, 42, 44, 46 can be any rigid member, and in some embodiments include elongated hollow members with a square or circular cross-sectional shape comprising aluminum (e.g., powder-coated aluminum). In some embodiments, the legs are adjustable in length (e.g., between about 13 to about 18 inches). In such embodiments, as illustrated on leg 40 in FIG. 1, each leg can include a first leg member 150 with a series of apertures 160 and a second leg member 170 received within the first leg member. The second leg member can include a spring loaded protrusion (not shown) to engage one of the series of apertures. Of course, these features could be reversed with the first leg member having a spring loaded protrusion and the second leg member having a series of apertures. In use, a user can depress the protrusion and engage the first and second leg members until the protrusion is aligned with an aperture corresponding to a desired height. When the desired aperture is reached the protrusion can be allowed to engage the aperture to set the height of the leg.

Figure 4A:
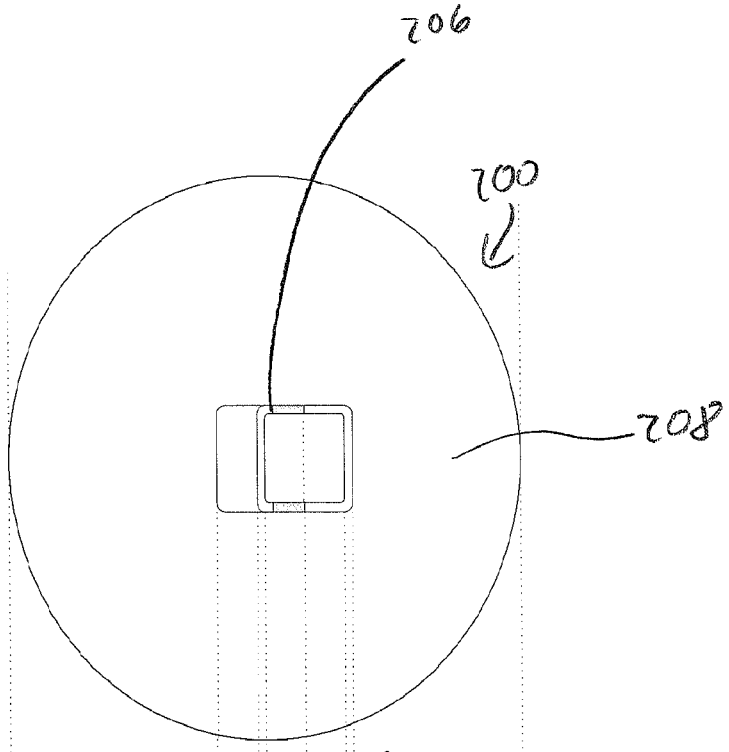
FIG. 4A shows a top plan view of a chair foot in accordance with an embodiment of the invention.
Figure 4B:
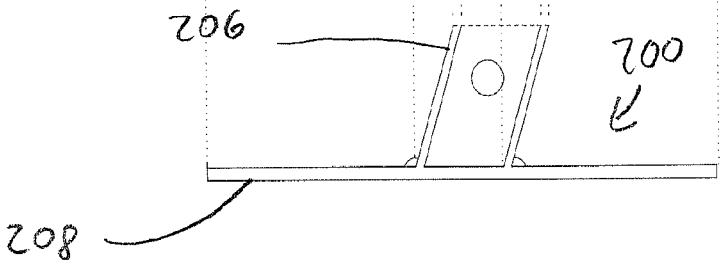
FIG. 4B shows a side plan view of a chair foot in accordance with an embodiment of the invention.

In some embodiments, as shown in FIGS. 4A-B, the chair system 10 can also include a foot 200 (e.g., first, second, third, and fourth feet) detachably attached (e.g., via pins) to the first, second, third, and fourth legs 40, 42, 44, 46, respectively. In some embodiments, each foot 200 has a portion with a horizontal cross-section area greater than a horizontal cross-section of the respective leg. As shown in FIGS. 4A-B, in some embodiments, the foot has an upright portion 206 which can extend into a leg when attached, and a horizontal portion 208 for placing in apposition to a support surface such as the ground. Such embodiments are useful for providing increased stabilization when the chair is in the seating configuration. Further, because the feet are easily detachable, they can be removed before the chair is placed in the stowing configuration.

As shown in FIGS. 1-3A, the chair system 10 can also include first and second arms 300, 302. In some embodiments, the first and second arms are pivotably coupled to the back 78 to provide a compact size in the stowing configuration. In certain embodiments, as shown in FIG. 1, the first and second arms are pivotably connected to the back via bolts 306. In some embodiments, the arms include padded arm rests 308 over a ridged member 310 to provide comfort to a user.

Figure 3B:
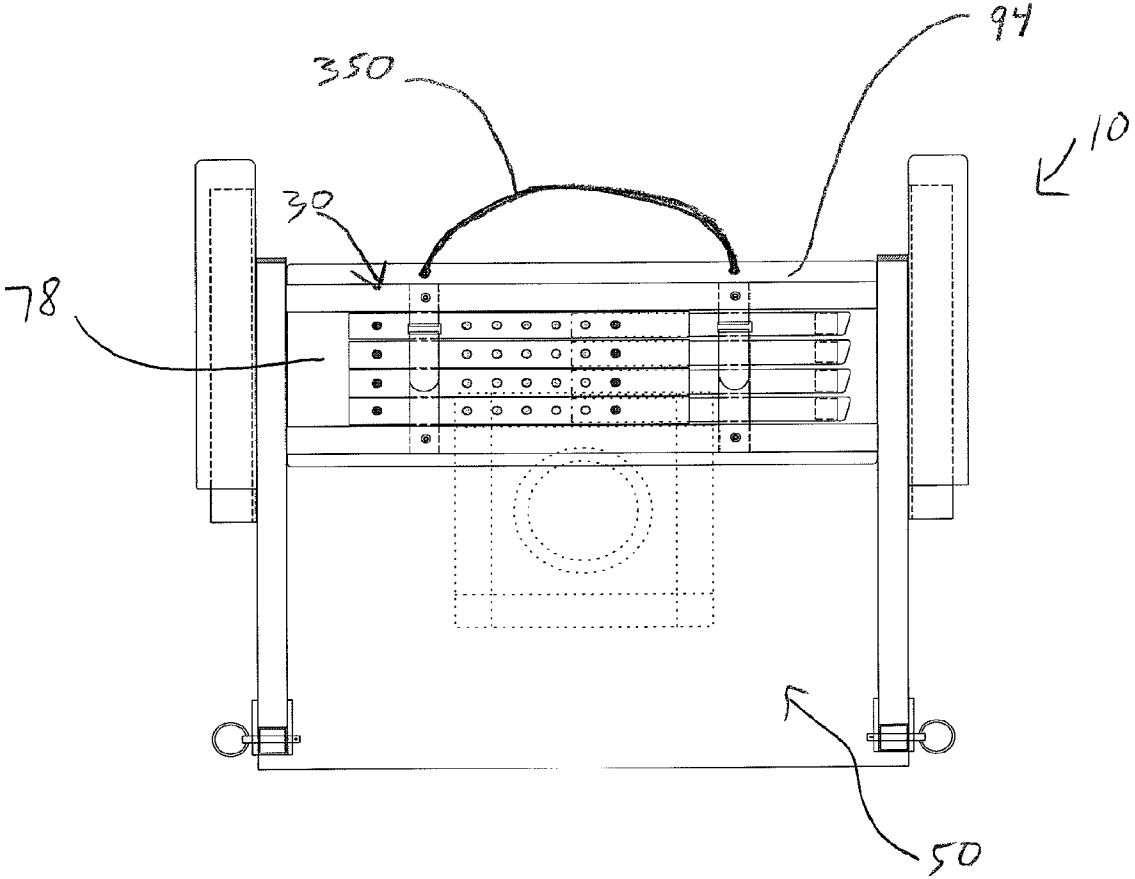
FIG. 3B shows a back plan view with hidden lines of a chair with integrated handles in a stowing configuration in accordance with an embodiment of the invention.

Some embodiments of the chair 10 include integrated handles to enhance the chair's portability while in the stowing configuration. As shown in FIG. 3B, a handle 350 can be attached to the chair at a location convenient for carrying the chair. In the embodiment shown in FIG. 3B, the handle is attached to the back 78 proximate the first horizontal frame member 94. In some embodiments, a second handle aligned with the first handle is attached to base assembly 50 (not shown in FIG. 3B). The handles may include straps, and a hook and loop handle wrap may be provided to connect any aligned handles.

Accordingly, embodiments of the invention include a chair system 10 with a first leg retention assembly 20 useful for a seating configuration and a second leg retention assembly 30 useful for a stowing configuration. Embodiments of the invention also provide for a compact stowing configuration. In some embodiments, the chair has a maximum thickness of less than about 12 inches (e.g. less than about 10 inches), a maximum width between about 25 inches and about 28 inches (e.g. about 26 inches), and a maximum height between about 20 inches and about 24 inches (e.g., about 22 inches) when in the stowing configuration, yet provides a full-size chair having a maximum height between about 38 inches and about 42 inches (e.g., about 39 inches) (in embodiments including legs with an adjustable length, this height is with the legs adjusted to their maximum length) and a maximum width between about 25 inches and about 28 inches (e.g. about 26 inches) when in the seating configuration. Accordingly, some embodiments of the chair have a ratio of a height in the stowing configuration over a height in the seating configuration that is between about 0.5 to about 0.7. Such an embodiment allows the chair to be easily portable while in the stowing configuration. Further, embodiments of the invention can achieve these dimensional results while allowing the base to swivel with respect to the legs 40, 42, 44, 46 via a swivel system when the chair is in the stowing configuration, and can also provide arms to increase the comfort of a user. In addition, the chair is compact enough to be easily carried in a bag when it is in the stowing configuration.

Embodiments of the invention also include methods of selectively configuring any of the various embodiments of chairs described herein between a seating configuration and a stowing configuration. Embodiments of such methods include one or more of the steps of: attaching or detaching first, second, third, and fourth legs from a first leg retention assembly, attaching or detaching first, second, third, and fourth legs to a second leg retention assembly, folding a base and a back together or apart about a pivot, pivoting first and second arms about a back, and attaching and detaching first, second, third, and fourth feet from first, second, third, and fourth legs, respectively.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations, which fall within the spirit and broad scope of the invention.

What is claimed is:

1. A stowable chair system, comprising:

a base assembly;

a back pivotably connected to the base assembly; and a first leg retention assembly operatively coupled to the base assembly to selectively retain and position first, second, third and fourth legs in a seating configuration, and a second leg retention assembly separate from the first leg retention assembly to selectively retain and position the first, second, third, and fourth legs in a stowing configuration, wherein the back has a first perimeter edge and a second perimeter edge opposite the first perimeter edge, and a third perimeter edge and a fourth perimeter edge opposite the third perimeter edge, and the first, second, third, and fourth legs do not extend beyond any of the first, second, third, or fourth perimeter edges when they are retained by the second leg retention assembly in the stowing configuration.

2. The stowable chair system of claim 1, wherein the first leg retention assembly includes first, second, third, and fourth leg attachment members extending from the base assembly.

3. The stowable chair system of claim 1, wherein the second leg retention assembly includes a strap system.

4. The stowable chair system of claim 3, wherein the strap system includes hook and loop straps.

5. The stowable chair system of claim 1, wherein the second leg retention assembly includes two hook and loop straps attached to the back.

6. The stowable chair system of claim 1, wherein the base assembly defines a plane and the first, second, third, and fourth legs extend from the plane when retained by the first leg retention assembly in the seating configuration, and the first, second, third, and fourth legs are generally parallel to the plane when retained by the second leg retention assembly in the stowing configuration.

7. The stowable chair system of claim 1, wherein the base assembly includes a first base member pivotably connected to the back and a second base member spaced from the first base member, the second base member including the first leg retention assembly and being swivably connected to the first base member by a swivel system.

8. The stowable chair system of claim 7, wherein the first base member provides a seating surface for a user.

9. The stowable chair system of claim 1, further including first and second arms pivotably coupled to the back.

10. The stowable chair system of claim 1, wherein the first, second, third, and fourth legs are adjustable in length.

11. The stowable chair system of claim 1, further including first, second, third, and fourth feet detachably attached to the first, second, third, and fourth legs, respectively, the feet having a portion with a horizontal cross-sectional area greater than a horizontal cross-sectional area of the respective legs.

12. The stowable chair system of claim 11, wherein the first, second, third, and fourth feet have an upright portion extending into a respective leg when attached, and a horizontal portion for placing in apposition to a support surface.

13. The stowable chair system of claim 1, wherein the second leg retention assembly retains the first, second, third, and fourth legs in parallel to each other.

14. The stowable chair system of claim 1, wherein the second leg retention assembly retains the first, second, third, and fourth legs in a single plane.

15. The stowable chair system of claim 1, wherein the second leg retention assembly retains the first leg in apposition to the second leg, the second leg in apposition to the first leg and the third leg, the third leg in apposition to the second leg and the fourth leg, and the fourth leg in apposition to the third leg.

16. A stowable chair system, comprising:

a base assembly;

a back pivotably connected to the base assembly; and a first leg retention assembly operatively coupled to the base assembly to selectively retain and position first, second, third and fourth legs in a seating configuration, and a second leg retention assembly separate from the first leg retention assembly to selectively retain and position the first, second, third, and fourth legs in a stowing configuration, wherein the back has a first upright member and a second upright member spaced from the first upright member, and a first horizontal frame member and a second horizontal member connected to the first and second upright members, the second horizontal member being spaced from the first horizontal member, an area defined by the first and second upright members and the first and second horizontal members being sized to receive the first, second, third, and fourth legs when the first, second, third, and fourth legs are retained by the second leg retention assembly in the stowing configuration.

17. The stowable chair system of claim 16, wherein the second leg retention assembly includes a strap system spanning a distance between the first and second horizontal members.

18. The stowable chair system of claim 16, further including a substrate spanning an area defined by the first and second upright members and the first and second horizontal members.

19. The stowable chair system of claim 16, wherein the first leg retention assembly includes first, second, third, and fourth leg attachment members extending from the base assembly.

20. The stowable chair system of claim 16, wherein the second leg retention assembly includes a strap system.

21. The stowable chair system of claim 16, wherein the base assembly defines a plane and the first, second, third, and fourth legs extend from the plane when retained by the first leg retention assembly in the seating configuration, and the first, second, third, and fourth legs are generally parallel to the plane when retained by the second leg retention assembly in the stowing configuration.

22. The stowable chair system of claim 16, wherein the base assembly includes a first base member pivotably connected to the back and a second base member spaced from the first base member, the second base member including the first leg retention assembly and being swivably connected to the first base member by a swivel system.

23. The stowable chair system of claim 22, wherein the first base member provides a seating surface for a user.

24. The stowable chair system of claim 16, further including first and second arms pivotably coupled to the back.

25. The stowable chair system of claim 16, wherein the first, second, third, and fourth legs are adjustable in length.

*26. A stowable chair system, comprising:*

*a base assembly;*

*a back pivotably connected to the base assembly; and*

*a first leg retention assembly operatively coupled to the base assembly to selectively retain and position a plurality of legs in a seating configuration, and a second leg retention assembly separate from the first leg retention assembly to selectively retain and position the plurality of legs in a stowing configuration,*

*wherein the back has a first perimeter edge and a second perimeter edge opposite the first perimeter edge, and a third perimeter edge and a fourth perimeter edge opposite the third perimeter edge, and the plurality of legs do not extend beyond any of the first, second, third, or fourth perimeter edges when they are retained by the second leg retention assembly in the stowing configuration.*

*27. The stowable chair system of claim 26, wherein the second leg retention assembly retains the plurality of legs generally parallel to each other.*

*28. The stowable chair system of claim 27, wherein the base assembly defines a plane and the plurality of legs extend from the plane when retained by the first leg retention assembly in the seating configuration, and the plurality of legs are generally parallel to the plane when retained by the second leg retention assembly in the stowing configuration.*

*29. The stowable chair system of claim 28, wherein the base assembly includes a first base member and a second base member spaced from the first base member, the second base member including the first leg retention assembly and being swivably connected to the first base member by a swivel system.*

*30. The stowable chair system of claim 29, wherein the first base member provides a seating surface for a user.*

*31. The stowable chair system of claim 30, further including first and second arms pivotably coupled to the back.*

*32. The stowable chair system of claim 30, wherein the second leg retention assembly includes a strap system.*

*33. The stowable chair system of claim 32, wherein the strap system includes two joinable strap members.*

*34. The stowable chair system of claim 30, further comprising a handle strap.*

*35. The stowable chair system of claim 30, wherein the plurality of legs are adjustable in length.*

*36. The stowable chair system of claim 35, further including a plurality of feet attached to the plurality of legs, the plurality of feet having a portion with a horizontal cross-sectional area greater than a horizontal cross-sectional area of the plurality of legs.*

*37. The stowable chair system of claim 36, wherein the plurality of feet have an upright portion extending into a respective leg, and a horizontal portion for placing in apposition to a support surface.*

*38. A stowable chair system, comprising:*

*a base assembly;*

*a back pivotably connected to the base assembly; and*

*a first leg retention assembly operatively coupled to the base assembly to selectively retain and position a plurality of legs in a seating configuration, and a second leg retention assembly separate from the first leg retention assembly to selectively retain and position the plurality of legs in a stowing configuration,*

*wherein the back has a first upright member and a second upright member spaced from the first upright member,*

*and a first horizontal frame member and a second horizontal member connected to the first and second upright members, the second horizontal member being spaced from the first horizontal member, an area defined by the first and second upright members and the first and second horizontal members being sized to receive the plurality of legs when the plurality of legs are retained by the second leg retention assembly in the stowing configuration.*

*39. The stowable chair system of claim 38, further including a substrate spanning an area defined by the first and second upright members and the first and second horizontal members.*

*40. The stowable chair system of claim 38, wherein the base assembly defines a plane and the plurality of legs extend from the plane when retained by the first leg retention assembly in the seating configuration, and the plurality of legs are generally parallel to the plane when retained by the second leg retention assembly in the stowing configuration.*

*41. The stowable chair system of claim 40, wherein the base assembly includes a first base member pivotably connected to the back and a second base member spaced from the first base member, the second base member including the first leg retention assembly and being swivably connected to the first base member by a swivel system.*

*42. The stowable chair system of claim 41, wherein the first base member provides a seating surface for a user.*

*43. The stowable chair system of claim 42, further including first and second arms pivotably coupled to the back.*

*44. The stowable chair system of claim 41, wherein the plurality of legs are adjustable in length.*

*45. The stowable chair system of claim 44, wherein the second leg retention assembly includes a strap system.*

*46. The stowable chair system of claim 45, wherein the strap system includes two joinable strap members.*

*47. The stowable chair system of claim 41, further comprising a handle strap.*

*48. The stowable chair system of claim 47, wherein the second leg retention assembly includes a strap system.*

*49. The stowable chair system of claim 48, wherein the strap system includes two joinable strap members.*

* * * * *